United States Patent
Nakahara et al.

(10) Patent No.: US 7,732,540 B2
(45) Date of Patent: Jun. 8, 2010

(54) PROCESS FOR PRODUCING OLEFIN COPOLYMERIZATION CATALYST AND PROCESS FOR PRODUCING OLEFIN COPOLYMER

(75) Inventors: Shinya Nakahara, Ichihara (JP); Shin-ichi Kumamoto, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/945,019

(22) Filed: Nov. 26, 2007

(65) Prior Publication Data

US 2009/0018012 A1 Jan. 15, 2009

(30) Foreign Application Priority Data

Dec. 8, 2006 (JP) ............................ 2006-331700

(51) Int. Cl.
- C08F 4/50 (2006.01)
- C08F 4/52 (2006.01)
- C08F 4/58 (2006.01)
- C08F 4/602 (2006.01)
- C08F 4/614 (2006.01)
- B01J 37/16 (2006.01)

(52) U.S. Cl. .................... 526/125.1; 526/126; 526/141; 502/104

(58) Field of Classification Search ........................ None
See application file for complete search history.

(56) References Cited

U.S. PATENT DOCUMENTS

| | | | |
|---|---|---|---|
| 4,189,556 A | 2/1980 | Karayannis et al. | |
| 5,089,573 A * | 2/1992 | Job | 526/125.6 |
| 5,134,209 A | 7/1992 | Job et al. | |
| 5,948,720 A * | 9/1999 | Sun et al. | 502/105 |
| 6,187,883 B1 | 2/2001 | Satoh et al. | |

FOREIGN PATENT DOCUMENTS

| | | | |
|---|---|---|---|
| CN | 1769307 A | | 5/2006 |
| EP | 0264169 B1 | | 11/1990 |
| JP | 48095397 A | | 12/1973 |
| JP | 49053675 A | | 5/1974 |
| JP | 3205406 A | | 9/1991 |
| JP | 04168107 A | | 6/1992 |
| JP | 04168108 A | | 6/1992 |
| JP | 08100037 A | * | 4/1996 |
| JP | 2004-182981 A | | 7/2004 |

OTHER PUBLICATIONS

Corresponding Application No., filed concurrently herewith of same inventors and title, application number not yet known.

* cited by examiner

*Primary Examiner*—Melvin C Mayes
*Assistant Examiner*—James Corno
(74) *Attorney, Agent, or Firm*—Panitch Schwarze Belisario & Nadel LLP

(57) ABSTRACT

A process for producing an olefin copolymerization catalyst, comprising the step of contacting, with one another, (A) a solid catalyst component containing a titanium atom, a magnesium atom and a halogen atom, (B) an organoaluminum compound and/or organoaluminumoxy compound, and (C) a nitrogen-containing aromatic heterocyclic compound, whose one or more carbon atoms adjacent to its nitrogen atom are linked to an electron-withdrawing group, or a group containing an electron-withdrawing group; and a process for producing an olefin copolymer using the an olefin copolymerization catalyst.

10 Claims, No Drawings

PROCESS FOR PRODUCING OLEFIN COPOLYMERIZATION CATALYST AND PROCESS FOR PRODUCING OLEFIN COPOLYMER

FIELD OF THE INVENTION

The present invention relates to a process for producing an olefin copolymerization catalyst, and a process for producing an olefin copolymer.

BACKGROUND OF THE INVENTION

It is known in the art to combine polypropylene with an olefin copolymer such as an ethylene-propylene copolymer and an ethylene-1-butene copolymer, in order to improve impact resistance of the polypropylene. As a process for producing such an olefin copolymer, JP 3-205406A discloses a process for producing an ethylene-propylene random copolymer rubber by copolymerizing ethylene with propylene with use of a solid catalyst component obtained by contacting (i) a homogeneous solution obtained by contacting diethoxymagnesium with tetrabutoxytitanium, (ii) a specified electron-donating compound, and (iii) titanium tetrachloride, with one another.

SUMMARY OF THE INVENTION

However, the process disclosed in JP 3-205406A has a problem in that its copolymerization activity is insufficient, although the ethylene-propylene random copolymer rubber has a good randomness. The term "randomness" is explained hereinafter in detail.

In view of the above problem in the conventional art, the present invention has an object to provide (i) a process for producing a random olefin copolymer having excellent randomness in a high copolymerization activity, and (ii) a process for producing an olefin copolymerization catalyst usable for the above process.

The present invention is a process for producing an olefin copolymerization catalyst, which comprises the step of contacting the following components (A), (B) and (C) with one another:

(A) a solid catalyst component containing a titanium atom, a magnesium atom and a halogen atom;

(B) an organoaluminum compound and/or organoaluminumoxy compound; and (C) a nitrogen-containing aromatic heterocyclic compound, whose one or more carbon atoms adjacent to its nitrogen atom are linked to an electron-withdrawing group, or to a group containing an electron-withdrawing group.

The above-defined "group containing an electron-withdrawing group" in the component (C) is referred to hereinafter as an "electron-withdrawing group-containing group".

Also, the present invention is a process for producing an olefin copolymer, which comprises the step of contacting two or more kinds of olefins with an olefin copolymerization catalyst produced according to the above process.

DETAILED DESCRIPTION OF THE INVENTION

The "nitrogen-containing aromatic heterocyclic compound" in the component (C) used in the present invention has an aromatic ring containing one or more nitrogen atoms and plural carbon atoms. Examples of the nitrogen-containing aromatic heterocyclic compound having one nitrogen atom are pyridine, pyrrole, indole, quinoline, benzquinoline, phenanthridine and isoquinoline. Examples thereof having two nitrogen atoms are pyrimidine, pyrazine, pyridazine, pyrazole, imidazole, quinoxaline and benzimidazole. Among them, preferred is a nitrogen-containing aromatic heterocyclic compound having one nitrogen atom, more preferred is a 6-membered cyclic compound, and further preferred is pyridine.

The electron-withdrawing group in the component (C) has a positive substituent constant, G, in the Hammet's rule known in the art.

Examples of the electron-withdrawing group in the component (C) are a halogen atom such as a fluorine atom, a chlorine atom, a bromine atom and an iodine atom; a cyano group; a nitro group; a carbonyl group; a sulfonyl group; and a phenyl group.

Examples of the electron-withdrawing group-containing group in the component (C) are a halogenated hydrocarbyl group such as a halogenated alkyl group and a halogenated aryl group; a cyanated hydrocarbyl group such as a cyanated aryl group; a nitrated hydrocarbyl group such as a nitrated aryl group; a hydrocarbyloxycarbonyl group such as an alkoxycarbonyl group, an aralkyloxycarbonyl group and an aryloxycarbonyl group; and an acyloxy group.

Examples of the above halogenated alkyl group are a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, and a 1,1-bis(triiodomethyl)-2,2,2-triiodoethyl group.

Examples of the above halogenated aryl group are an aryl group having one or more halogen atoms on one or more carbon atoms of its aromatic ring, such as a 2-fluorophenyl group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 2-iodophenyl group, a 3-iodophenyl group, a 4-iodophenyl group, a 2,6-difluorophenyl group, a 3,5-difluorophenyl group, a 2,6-dichlorophenyl group, a 3,5-dichlorophenyl group, a 2,6-dibromophenyl group, a 3,5-dibromophenyl group, a 2,6-diiodophenyl group, a 3,5-diiodophenyl group, a 2,4,6-trifluorophenyl group, a 3,4,5-trifluorophenyl group, a 2,4,6-trichlorophenyl group, a 2,4,6-tribromophenyl group, a 2,4,6-triiodophenyl group, a pentafluorophenyl group, a pentachlorophenyl group, a pentabromophenyl group, and a pentaiodophenyl group; and an aryl group having one or more halogenated alkyl groups on one or more carbon atoms of its aromatic ring, such as a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, and a 2,4,6-tris(trifluoromethyl)phenyl group.

Examples of the above cyanated aryl group are a 2-cyanophenyl group, a 3-cyanophenyl group and a 4-cyanophenyl group.

Examples of the above nitrated aryl group are a 2-nitrophenyl group, a 3-nitrophenyl group and a 4-nitrophenyl group.

Examples of the above alkoxycarbonyl group are a methoxycarbonyl group, an ethoxycarbonyl group, a n-propoxycarbonyl group, an isopropoxycarbonyl group, and a trifluoromethoxycarbonyl group.

An example of the above aralkyloxycarbonyl group is a benzyloxycarbonyl group.

Examples of the above aryloxycarbonyl group are a phenoxycarbonyl group and a pentafluorophenoxycarbonyl group.

Examples of the above acyloxy group are a methylcarbonyloxy group and an ethylcarbonyloxy group.

The electron-withdrawing group or electron-withdrawing group-containing group in the component (C) is preferably a halogen atom, a cyano group, a nitro group or a halogenated alkyl group; more preferably a halogen atom, a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group or a triiodomethyl group; further preferably a halogen atom such as a fluorine atom, a chlorine atom, a bromine atom and an iodine atom; and particularly preferably a fluorine atom or a chlorine atom.

The component (C) is preferably a compound having an electron-withdrawing group or an electron-withdrawing group-containing group linked to each of two carbon atoms adjacent to its nitrogen atom, in order to produce a random olefin copolymer having excellent randomness.

The component (C) may be a compound known in the art. Examples thereof are a pyridine compound having an electron-withdrawing group or an electron-withdrawing group-containing group at its 2-position, at its 2- and 6-positions, or at its 2-, 4- and 6-positions, such as 2-fluoropyridine, 2,6-difluoropyridine, 2,4,6-trifluoropyridine, 2-chloropyridine, 2,6-dichloropyridine, 2,4,6-trichloropyridine, 2-bromopyridine, 2,6-dibromopyridine, 2,4,6-tribromopyridine, 2-iodopyridine, 2,6-diiodopyridine, 2,4,6-triiodopyridine, 2-cyanopyridine, 2,6-dicyanopyridine, 2,4,6-tricyanopyridine, 2-nitropyridine, 2,6-dinitropyridine, 2,4,6-trinitropyridine, 2-fluoromethylpyridine, 2,6-di(fluoromethyl)pyridine, 2,4,6-tri(fluoromethyl)pyridine, 2-difluoromethylpyridine, 2,6-bis(difluoromethyl)pyridine, 2,4,6-tris(difluoromethyl)pyridine, 2-trifluoromethylpyridine, 2,6-bis(trifluoromethyl)pyridine, 2,4,6-tris(trifluoromethyl)pyridine, 2-chloromethylpyridine, 2,6-di(chloromethyl)pyridine, 2,4,6-tri(chloromethyl)pyridine, 2-dichloromethylpyridine, 2,6-bis(dichloromethyl)pyridine, 2,4,6-tris(dichloromethyl)pyridine, 2-trichloromethylpyridine, 2,6-bis(trichloromethyl)pyridine, and 2,4,6-tris(trichloromethyl)pyridine; a quinoline compound such as 2-fluoroquinoline, 2,4-difluoroquinoline, 2-chloroquinoline, 2,4-dichloroquinoline, 2-bromoquinoline, 2,4-dibromoquinoline, 2-iodoquinoline, 2,4-diiodoquinoline, 2-cyanoquinoline, 2,4-dicyanoquinoline, 2-nitroquinoline, 2,4-dinitroquinoline, 2-fluoromethylquinoline, 2,4-di(fluoromethyl)quinoline, 2-difluoromethylquinoline, 2,4-bis(difluoromethyl)quinoline, 2-trifluoromethylquinoline, 2,4-bis(trifluoromethyl)quinoline, 2-chloromethylquinoline, 2,4-di(chloromethyl)quinoline, 2-dichloromethylquinoline, 2,4-bis(dichloromethyl)quinoline, 2-trichloromethylquinoline, and 2,4-bis(trichloromethyl)quinoline; an isoquinoline compound such as 1-fluoroisoquinoline, 1,3-difluoroisoquinoline, 1-chloroisoquinoline, 1,3-dichloroisoquinoline, 1-bromoisoquinoline, 1,3-dibromoisoquinoline, 1-iodoisoquinoline, 1,3-diiodoisoquinoline, 1-cyanoisoquinoline, 1,3-dicyanoisoquinoline, 1-nitroisoquinoline, 1,3-dinitroisoquinoline, 1-fluoromethylisoquinoline, 1,3-di(fluoromethyl)isoquinoline, 1-difluoromethylisoquinoline, 1,3-bis(difluoromethyl)isoquinoline, 1-trifluoromethylisoquinoline, 1,3-bis(trifluoromethyl)isoquinoline, 1-chloromethylisoquinoline, 1,3-di(chloromethyl)isoquinoline, 1-dichloromethylisoquinoline, 1,3-bis(dichloromethyl)isoquinoline, 1-trichloromethylisoquinoline, and 1,3-bis(trichloromethyl)isoquinoline; a pyrrole compound such as 2-fluoropyrrole, 2,5-difluoropyrrole, 2-chloropyrrole, 2,5-dichloropyrrole, 2-bromopyrrole, 2,5-dibromopyrrole, 2-iodopyrrole, 2,5-diiodopyrrole, 2-cyanopyrrole, 2,5-dicyanopyrrole, 2-nitropyrrole, 2,5-dinitropyrrole, 2-fluoromethylpyrrole, 2,5-di(fluoromethyl)pyrrole, 2-difluoromethylpyrrole, 2,5-bis(difluoromethyl)pyrrole, 2-trifluoromethylpyrrole, 2,5-bis(trifluoromethyl)pyrrole, 2-chloromethylpyrrole, 2,5-di(chloromethyl)pyrrole, 2-dichloromethylpyrrole, 2,5-bis(dichloromethyl)pyrrole, 2-trichloromethylpyrrole, and 2,4-bis(trichloromethyl)pyrrole; an indole compound such as 2-fluoroindole, 2-chloroindole, 2-bromoindole, 2-iodoindole, 2-cyanoindole, 2-nitroindole, 2-fluoromethylindole, 2-difluoromethylindole, 2-trifluoromethylindole, 2-chloromethylindole, 2-dichloromethylindole, and 2-trichloromethylindole; a pyrimidine compound such as 2-fluoropyrimidine, 2,6-difluoropyrimidine, 2,4,6-trifluoropyrimidine, 2-chloropyrimidine, 2,6-dichloropyrimidine, 2,4,6-trichloropyrimidine, 2-bromopyrimidine, 2,6-dibromopyrimidine, 2,4,6-tribromopyrimidine, 2-iodopyrimidine, 2,6-diiodopyrimidine, 2,4,6-triiodopyrimidine, 2-cyanopyrimidine, 2,6-dicyanopyrimidine, 2,4,6-tricyanopyrimidine, 2-nitropyrimidine, 2,6-dinitropyrimidine, 2,4,6-trinitropyrimidine, 2-fluoromethylpyrimidine, 2,6-di(fluoromethyl)pyrimidine, 2,4,6-tri(fluoromethyl)pyrimidine, 2-difluoromethylpyrimidine, 2,6-bis(difluoromethyl)pyrimidine, 2,4,6-tris(difluoromethyl)pyrimidine, 2-trifluoromethylpyrimidine, 2,6-bis(trifluoromethyl)pyrimidine, 2,4,6-tris(trifluoromethyl)pyrimidine, 2-chloromethylpyrimidine, 2,6-di(chloromethyl)pyrimidine, 2,4,6-tri(chloromethyl)pyrimidine, 2-dichloromethylpyrimidine, 2,6-bis(dichloromethyl)pyrimidine, 2,4,6-tris(dichloromethyl)pyrimidine, 2-trichloromethylpyrimidine, 2,6-bis(trichloromethyl)pyrimidine, and 2,4,6-tris(trichloromethyl)pyrimidine; a pyrazine compound such as 2-fluoropyrazine, 2,6-difluoropyrazine, 2-chloropyrazine, 2,6-dichloropyrazine, 2-bromopyrazine, 2,6-dibromopyrazine, 2-iodopyrazine, 2,6-diiodopyrazine, 2-cyanopyrazine, 2,6-dicyanopyrazine, 2-nitropyrazine, 2,6-dinitropyrazine, 2-fluoromethylpyrazine, 2,6-di(fluoromethyl)pyrazine, 2-difluoromethylpyrazine, 2,6-bis(difluoromethyl)pyrazine, 2-trifluoromethylpyrazine, 2,6-bis(trifluoromethyl)pyrazine, 2-chloromethylpyrazine, 2,6-di(chloromethyl)pyrazine, 2-dichloromethylpyrazine, 2,6-bis(dichloromethyl)pyrazine, 2-trichloromethylpyrazine, and 2,6-bis(trichloromethyl)pyrazine; a pyridazine compound such as 3-fluoropyridazine, 3,6-difluoropyridazine, 3-chloropyridazine, 3,6-dichloropyridazine, 3-bromopyridazine, 3,6-dibromopyridazine, 3-iodopyridazine, 3,6-diiodopyridazine, 3-cyanopyridazine, 3,6-dicyanopyridazine, 3-nitropyridazine, 3,6-dinitropyridazine, 3-fluoromethylpyridazine, 3,6-di(fluoromethyl)pyridazine, 3-difluoromethylpyridazine, 3,6-bis(difluoromethyl)pyridazine, 3-trifluoromethylpyridazine, 3,6-bis(trifluoromethyl)pyridazine, 3-chloromethylpyridazine, 3,6-di(chloromethyl)pyridazine, 3-dichloromethylpyridazine, 3,6-bis(dichloromethyl)pyridazine, 3-trichloromethylpyridazine, and 3,6-bis(trichloromethyl)pyridazine; a pyrazole compound such as 3-fluoropyrazole, 3,5-difluoropyrazole, 3-chloropyrazole, 3,5-dichloropyrazole, 3-bromopyrazole, 3,5-dibromopyrazole, 3-iodopyrazole, 3,5-diiodopyrazole, 3-cyanopyrazole, 3,5-dicyanopyrazole, 3-nitropyrazole, 3,5-dinitropyrazole, 3-fluoromethylpyrazole, 3,5-di(fluoromethyl)pyrazole, 3-difluoromethylpyrazole, 3,5-bis(difluoromethyl)pyrazole, 3-trifluoromethylpyrazole, 3,5-bis (trifluoromethyl)pyrazole, 3-chloromethylpyrazole, 3,5-di (chloromethyl)pyrazole, 3-dichloromethylpyrazole, 3,5-bis (dichloromethyl)pyrazole, 3-trichloromethylpyrazole, and 3,4-bis(trichloromethyl)pyrazole; and an imidazole compound such as 2-fluoroimidazole, 2,4-difluoroimidazole, 2-chloroimidazole, 2,4-dichloroimidazole, 2-bromoimidazole, 2,4-dibromoimidazole, 2-iodoimidazole, 2,4-diiodoimidazole, 2-cyanoimidazole, 2,4-dicyanoimidazole, 2-nitroimidazole, 2,4-dinitroimidazole, 2-fluoromethylimidazole, 2,4-di(fluoromethyl)imidazole, 2-difluoromethylimidazole, 2,4-bis(difluoromethyl)imidazole, 2-trifluoromethylimidazole, 2,4-bis(trifluoromethyl)imidazole, 2-chloromethylimidazole, 2,4-di(chloromethyl)imidazole, 2-dichloromethylimidazole, 2,4-bis(dichloromethyl)imidazole, 2-trichloromethylimidazole, and 2,4-bis(trichloromethyl)imidazole.

Among them, preferred is a pyridine compound such as the above-exemplified compounds; a quinoline compound such as the above-exemplified compounds; an isoquinoline compound such as the above-exemplified compounds; a pyrrole compound such as the above-exemplified compounds; or an indole compound such as the above-exemplified compounds.

More preferred is a pyridine compound such as the above-exemplified compounds.

Further preferred is 2,6-difluoropyridine, 2,4,6-trifluoropyridine, 2,6-dichloropyridine, 2,4,6-trichloropyridine, 2,6-dibromopyridine, 2,4,6-tribromopyridine, 2,6-diiodopyridine, 2,4,6-triiodopyridine, 2,6-dicyanopyridine, 2,4,6-tricyanopyridine, 2,6-dinitropyridine, 2,4,6-trinitropyridine, 2,6-di(fluoromethyl)pyridine, 2,4,6-tri(fluoromethyl)pyridine, 2,6-bis(difluoromethyl)pyridine, 2,4,6-tris(difluoromethyl)pyridine, 2,6-bis(trifluoromethyl)pyridine, 2,4,6-tris (trifluoromethyl)pyridine, 2,6-di(chloromethyl)pyridine, 2,4,6-tri(chloromethyl)pyridine, 2,6-bis(dichloromethyl)pyridine, 2,4,6-tris(dichloromethyl)pyridine, 2,6-bis(trichloromethyl)pyridine, or 2,4,6-tris(trichloromethyl)pyridine.

Particularly preferred is 2,6-difluoropyridine, 2,4,6-trifluoropyridine, 2,6-dichloropyridine, or 2,4,6-trichloropyridine.

Most preferred is 2,6-difluoropyridine or 2,6-dichloropyridine.

The component (A) in the present invention, which is usually particulate, may be a solid catalyst component known in the art. A production process of the component (A) is not particularly limited. Examples of the solid catalyst component known in the art and its production process are those disclosed in patent literatures such as JP 46-34092B, JP 47-41676B, JP 55-23561B, JP 57-24361B, JP 52-39431B, JP 52-36786B, JP 1-28049B, JP 3-43283B, JP 4-80044A, JP 55-52309A, JP 58-21405A, JP 61-181807A, JP 63-142008A, JP 5-339319A, JP 54-148093A, JP 4-227604A, JP 64-6006A, JP 6-179720A, JP 7-116252B, JP 8-134124A, JP 9-31119A, JP 11-228628A, JP 11-80234A, JP 11-322833A, JP 54-94590A, JP 5-55405A, JP 56-45909A, JP 56-163102A, JP 57-63310A, JP 57-115408A, JP 58-83006A, JP 58-83016A, JP 58-138707A, JP 59-149905A, JP 60-23404A, JP 60-32805A, JP 61-18330A, JP 61-55104A, JP 63-3010A, JP 1-315405A, JP 2-77413A, and JP 2-117905A.

The component (A) contains preferably an internal electron donor besides a titanium atom, a magnesium atom and a halogen atom. The internal electron donor is preferably organic acid esters or ethers, both mentioned hereinafter.

Examples of a production process of the component (A) are the following processes (1) to (4), among which the process (4) is preferable:

(1) a process comprising the step of contacting a magnesium halide with a titanium compound;

(2) a process comprising the step of contacting a magnesium halide, an internal electron donor and a titanium compound with one another;

(3) a process comprising the steps of (3-1) dissolving a magnesium halide and a titanium compound in an electron-donating solvent, thereby obtaining a solution, and (3-2) impregnating a carrier with the solution; and (4) a process comprising the step of contacting (a) a solid component containing a magnesium atom and a hydrocarbyloxy group, (b) a halogenation compound, and (c) an internal electron donor and/or (d) an organic acid halide, with one another.

Examples of the magnesium halide in the above-mentioned processes (1) to (3) are magnesium chloride, magnesium bromide, magnesium iodide and magnesium fluoride. Among them, preferred is magnesium chloride.

Examples of the solid component (a) in the above-mentioned process (4) are the following solid compounds 1) to 3), among which the solid compound 3) is preferable:

1) a solid compound of dihydrocarbyloxymagnesiums represented by the formula, $Mg(OR^1)(OR^2)$, wherein $R^1$ and $R^2$ is independently of each other a hydrocarbyl group having 1 to 20 carbon atoms;

2) a solid compound of hydrocarbyloxymagnesium halides represented by the formula, $Mg(OR^3)X^1$, wherein $R^3$ is a hydrocarbyl group having 1 to 20 carbon atoms, and $X^1$ is a halogen atom; and 3) a solid compound containing a trivalent titanium atom, a magnesium atom and a hydrocarbyloxy group.

Examples of the dihydrocarbyloxymagnesiums represented by the formula, $Mg(OR^1)(OR^2)$, mentioned in the above 1), are dimethoxymagnesium, diethoxymagnesium, dipropoxymagnesium, dibutoxymagnesium, dipentoxymagnesium, dihexyloxymagnesium, dioctoxymagnesium, diphenoxymagnesium, dicyclohexyloxymagnesium, methoxyethoxymagnesium, methoxypropoxymagnesium, methoxybutoxymagnesium, ethoxypropoxymagnesium, and ethoxybutoxymagnesium. Among them, preferred is dimethoxymagnesium, diethoxymagnesium or dipropoxymagnesium, and more preferred is diethoxymagnesium.

A process for producing the solid compound of dihydrocarbyloxymagnesiums represented by the formula, $Mg(OR^1)(OR^2)$, mentioned in the above 1), is not limited. Preferable examples of the process are (1) a process comprising the step of reacting a magnesium metal, an alcohol and a small amount of a halogen-containing compound and/or halogen, with one another, and (2) a process comprising the step of reacting a dialkylmagnesium compound with an alkoxysilicon compound.

Examples of the hydrocarbyloxymagnesium halides represented by the formula, $Mg(OR^3)X^1$, mentioned in the above 2), are methoxymagnesium chloride, ethoxymagnesium chloride, propoxymagnesium chloride, butoxymagnesium chloride, pentoxymagnesium chloride, hexyloxymagnesium chloride, octoxymagnesium chloride, phenoxymagnesium chloride, and cyclohexyloxymagnesium chloride, and compounds obtained by replacing the chlorine atom contained in the above-exemplified compounds with a fluorine atom, a bromine atom or a iodine atom. Among them, preferred is methoxymagnesium chloride, ethoxymagnesium chloride or propoxymagnesium chloride, and more preferred is ethoxymagnesium chloride.

A process for producing the solid compound of hydrocarbyloxymagnesium halides represented by the formula, $Mg(OR^3)X^1$, mentioned in the above 2), is not limited. Preferable examples of the process are (1) a process comprising the step of reacting a Grignard compound with an alkoxysilicon compound, and (2) a process comprising the step of reacting a Grignard compound with alcohol.

Examples of the hydrocarbyloxy group contained in the solid compound mentioned in the above 3) are hydrocarbyloxy groups having 1 to 20 carbon atoms. Among them, preferred is a methoxy group, an ethoxy group, a propoxy group, a butoxy group, a pentoxy group, or a hexoxy group.

The solid component (a) used in the present invention is preferably a solid component obtained by reducing a titanium compound (ii) represented by the following formula [I] with an organomagnesium compound (iii) in the presence of an organosilicon compound (i) containing a Si—O bond, or in the presence of a combination of the organosilicon compound (i) with an ester compound (iv):

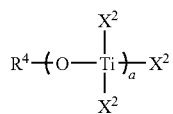

[I]

wherein a is a number of 1 to 20, and preferably a number satisfying $1 \leq a \leq 5$; $R^4$ is a hydrocarbyl group having 1 to 20 carbon atoms; and $X^2$ is independently of one another a halogen atom or a hydrocarbyloxy group having 1 to 20 carbon atoms.

The above-mentioned reduction of a titanium compound (ii) is carried out preferably in the presence of a combination of an organosilicon compound (i) with an ester compound (iv), in order to improve a polymerization activity of an olefin copolymerization catalyst in the present invention.

The solid compound mentioned in the above 3) contains a trivalent titanium atom in an amount of preferably 50% by weight or more, and more preferably 90% by weight or more, wherein a total amount of a titanium atom contained therein is 100% by weight. The solid compound mentioned in the above 3) contains a hydrocarbyloxy group in an amount of preferably 20% by weight or more, and more preferably 25% by weight or more, wherein a total amount of the solid compound is 100% by weight.

Examples of the above-mentioned organosilicon compound (i) are those compounds represented by the following respective formulas:

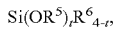

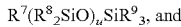

wherein $R^5$ is a hydrocarbyl group having 1 to 20 carbon atoms; $R^6$, $R^7$, $R^8$, $R^9$ and $R^{10}$ are independently of one another a hydrocarbyl group having 1 to 20 carbon atoms, or a hydrogen atom; t is an integer satisfying $0 < t \leq 4$; u is an integer of 1 to 1,000; and v is an integer of 2 to 1,000.

Examples of the organosilicon compound (i) are tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Among them, preferred is an alkoxysilane compound represented by the above formula, $Si(OR^5)_tR^6_{4-t}$, wherein t is preferably an integer satisfying $1 \leq t \leq 4$, and more preferably 4 (namely, tetraalkoxysilane compound). Tetraethoxysilane is the most preferable compound.

Examples of $R^4$ in the above formula [I] are an alkyl group such as a methyl group, an ethyl group, a propyl group, an isopropyl group, a butyl group, an isobutyl group, an amyl group, an isoamyl group, a hexyl group, a heptyl group, an octyl group, a decyl group and a dodecyl group; an aryl group such as a phenyl group, a cresyl group, a xylyl group and a naphthyl group; a cycloalkyl group such as a cyclohexyl group and a cyclopentyl group; an allyl group such as a propenyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of the halogen atom of $X^2$ in the above formula [I] are a chlorine atom, a bromine atom and an iodine atom. Among them, particularly preferred is a chlorine atom.

Examples of the hydrocarbyloxy group having 1 to 20 carbon atoms of $X^2$ in the above formula [I] are those groups derived from the above-exemplified hydrocarbyl groups as $R^4$, such as a methoxy group derived from a methyl group, an ethoxy group derived from an ethyl group, etc. Among them, particularly preferred is an alkoxy group derived from the above-exemplified linear alkyl group having 2 to 18 carbon atoms as $R^4$, such as an ethoxy group derived from an ethyl group, etc.

Examples of the above-mentioned titanium compound (ii) are tetramethoxytitanium, tetraethoxytitanium, tetra-n-propoxytitanium, tetraisopropoxytitanium, tetra-n-butoxytitanium, tetraisobutoxytitanium, n-butoxytitanium trichloride, di-n-butoxytitanium dichloride, tri-n-butoxytitanium chloride, di-n-tetraisopropylpolytitanate (mixture of compounds having "a" of 2 to 10 in the above formula [I]), tetra-n-butylpolytitanate (mixture of compounds having "a" of 2 to 10 in the above formula [I]), tetra-n-hexylpolytitanate (mixture of compounds having "a" of 2 to 10 in the above formula [I]), and tetra-n-octylpolytitanate (mixture of compounds having "a" of 2 to 10 in the above formula [I]), and a condensate obtained by reacting tetraalkoxytitanium with a small amount of water. Among them, preferred is a titanium compound having "a" of 1, 2 or 4 in the above formula [I], and particularly preferred is tetra-n-butoxytitanium, tetra-n-butyltitanium dimer, or tetra-n-butyltitanium tetramer. The above-exemplified titanium compounds may be used in a combination of two or more thereof.

The above-mentioned organomagnesium compound (iii) may be any compound containing a magnesium-carbon bond therein. The compound (iii) is preferably a Grignard compound represented by the following first formula, or a dihydrocarbylmagnesium represented by the following second formula:

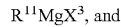

wherein $R^{11}$ is a hydrocarbyl group having 1 to 20 carbon atoms; $X^3$ is a halogen atom; and $R^{12}$ and $R^{33}$ are independently of each other a hydrocarbyl group having 1 to 20 carbon atoms. Among them, more preferred is a Grignard compound, and particularly preferred is an ether solution of a Grignard compound, in order to obtain an olefin copolymerization catalyst having a good shape.

Examples of $R^{11}$, $R^{12}$ and $R^{13}$ are an alkyl group having 1 to 20 carbon atoms, an aryl group, an aralkyl group and an alkenyl group, such as a methyl group, an ethyl group, a propyl group, an isopropyl group, a butyl group, a sec-butyl group, a tert-butyl group, an isoamyl group, a hexyl group, an octyl group, a 2-ethylhexyl group, a phenyl group and a benzyl group.

The organomagnesium compound (iii) may be used as its complex soluble in a hydrocarbon solvent, which complex can be obtained by reacting the compound (iii) with an organometal compound such as that of Li, Be, B, Al or Zn.

Examples of the above-mentioned ester compound (iv) are monocarboxylic acid esters and polycarboxylic acid esters. Among them, preferred are unsaturated aliphatic carboxylic acid esters such as methacrylic acid esters and maleic acid esters, or aromatic carboxylic acid esters such as phthalic acid esters, and particularly preferred are phthalic acid dialkyl esters. Specific examples thereof are saturated aliphatic carboxylic acid esters, unsaturated aliphatic carboxylic acid esters, alicyclic carboxylic acid esters, and aromatic carboxylic acid esters. More specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, di-n-octyl phthalate, di(2-ethylhexyl) phthalate, diisodecyl phthalate, dicyclohexyl phthalate and diphenyl phthalate.

Each of the above-mentioned organosilicon compound (i), titanium compound (ii) and ester compound (iv) is preferably combined with a solvent. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, di-n-butyl ether, diisoamyl ether and tetrahydrofuran.

A reaction temperature of the above-mentioned reduction is usually −50 to 70° C., preferably −30 to 50° C., and particularly preferably −25 to 35° C. A reaction time thereof is not particularly limited, and it is usually about 30 minutes to about 6 hours. The reduction reaction may be followed by heating at 20 to 120° C.

The solid component (a) prepared in the above-mentioned reduction may be supported on a carrier such as a porous inorganic oxide and a porous organic polymer. The carrier may be known in the art. Examples of the carrier are inorganic oxides such as $SiO_2$, $Al_2O_3$, $MgO$, $TiO_2$ and $ZrO_2$; and polymers such as polystyrene, a styrene-divinylbenzene copolymer, a styrene-ethylene glycol dimethacrylate copolymer, polymethyl acrylate, polyethyl acrylate, a methyl acrylate-divinylbenzene copolymer, polymethyl methacrylate, a methyl methacrylate-divinylbenzene copolymer, polyacrylonitrile, an acrylonitrile-divinylbenzene copolymer, polyvinyl chloride, polyethylene and polypropylene. Among them, preferred is an organic polymer, and particularly preferred is a styrene-divinylbenzene copolymer or an acrylonitrile-divinylbenzene copolymer.

In order to support effectively the solid component (a) on a carrier, the carrier has a pore volume of preferably 0.3 $cm^3/g$ or more, and more preferably 0.4 $cm^3/g$ or more, in a pore radius of 20 to 200 nm. A ratio of the above-mentioned pore volume is preferably 35% or more, and more preferably 40% or more, wherein a pore volume in a pore radius of 3.5 to 7,500 nm is 100%.

The above-mentioned organosilicon compound (i) is used in an amount of usually 1 to 500 gram atom, preferably 1 to 300 gram atom, and particularly preferably 3 to 100 gram atom, in terms of an amount of a silicon atom contained in the organosilicon compound (i), per 1 gram atom of a titanium atom contained in the above-mentioned titanium compound (ii) used.

The above-mentioned organomagnesium compound (iii) is used in an amount of usually 0.1 to 10, preferably 0.2 to 5.0, and particularly preferably 0.5 to 2.0, in terms of a ratio of (1) to (2), wherein (1) means a total of (1-1) an amount (gram atom) of a silicon atom contained in the organosilicon compound (i) used, and (1-2) an amount (gram atom) of a titanium atom contained in the titanium compound (ii) used, and (2) means an amount (gram atom) of a magnesium atom contained in the organomagnesium compound (iii) used.

Also, each of the organosilicon compound (i), the titanium compound (ii) and the organomagnesium compound (iii) is used in an amount of usually 1 to 51, preferably 2 to 31, and particularly preferably 4 to 26, in terms of a ratio of (1) to (2), wherein (1) means an amount (gram atom) of a magnesium atom contained in the component (A) produced, and (2) means an amount (gram atom) of a titanium atom contained therein.

The above-mentioned ester compound (iv) is used in an amount of usually 0.05 to 100 mol, preferably 0.1 to 60 mol, and particularly preferably 0.2 to 30 mol, per 1 gram atom of a titanium atom contained in the titanium compound (ii) used.

The solid component (a) obtained by the above-mentioned reduction is usually separated from a reaction mixture, and then, is washed several times with an inert hydrocarbon solvent such as hexane, heptane and toluene. The thus obtained solid component (a) contains a trivalent titanium atom, a magnesium atom and a hydrocarbyloxy group. The solid component (a) generally has an amorphous structure, or a very weak crystalline structure, and the former structure is particularly preferred.

The halogenation compound (b) used in the above-mentioned process (4) for producing the component (A) means a compound capable of replacing the hydrocarbyloxy group contained in the solid component (a) with a halogen atom. The halogenation compound (b) is preferably a halogen compound of Group 4, 13 or 14 element in the Periodic Table of the elements, and more preferably a halogen compound of Group 4 or 14 element. When the solid component (a) contains no titanium atom, at least a halogen compound of a titanium atom is used as the halogenation compound (b).

The above-mentioned halogen compound of Group 4 element is preferably a compound represented by the following formula:

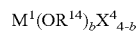

$$M^1(OR^{14})_b X^4_{4-b}$$

wherein $M^1$ is an atom of Group 4; $R^{14}$ is a hydrocarbyl group having 1 to 20 carbon atoms, and when plural $R^{14}$s exist, they are the same as, or different from one another; $X^4$ is a halogen atom; and b is a number satisfying $0 \leq b < 4$, preferably $0 \leq b \leq 2$, and particularly preferably $b=0$.

Examples of the above-mentioned $M^1$ are a titanium atom, a zirconium atom and a hafnium atom. Among them, preferred is a titanium atom.

Examples of the above-mentioned $R^{14}$ are an alkyl group such as a methyl group, an ethyl group, a propyl group, an isopropyl group, a butyl group, an isobutyl group, a tert-butyl group, an amyl group, an isoamyl group, a tert-amyl group, a hexyl group, a heptyl group, an octyl group, a decyl group and a dodecyl group; an aryl group such as a phenyl group, a cresyl group, a xylyl group and a naphthyl group; an allyl group such as a propenyl group; and an aralkyl group such as a benzyl group. Among them, preferred is an alkyl group having 2 to 18 carbon atoms, or an aryl group having 6 to 18 carbon atoms, and particularly preferred is a linear alkyl group having 2 to 18 carbon atoms.

Examples of $X^4$ are a chlorine atom, a bromine atom and an iodine atom. Among them, particularly preferred is a chlorine atom.

Examples of the halogen compound of Group 4 element represented by the above formula are a titanium tetrahalide such as titanium tetrachloride, titanium tetrabromide and titanium tetraiodide; an alkoxytitanium trihalide such as methoxytitanium trichloride, ethoxytitanium trichloride, butoxytitanium trichloride, phenoxytitanium trichloride and ethoxytitanium tribromide; and a dialkoxytitanium dihalide such as dimethoxytitanium dichloride, diethoxytitanium dichloride, dibutoxytitanium dichloride, diphenoxytitanium dichloride and diethoxytitanium dibromide; and hafnium compounds obtained by replacing the titanium atom contained in the above-exemplified titanium compounds with a hafnium atom. Among them, most preferred is titanium tetrachloride.

The above-mentioned halogen compound of Group 13 or 14 element is preferably a compound represented by the following formula:

$$M^2 R^{15}_{m-c} X^5_c$$

wherein $M^2$ is an atom of Group 13 or 14; $R^{15}$ is a hydrocarbyl group having 1 to 20 carbon atoms; $X^5$ is a halogen atom; m is the valence of $M^2$; and c is a number satisfying $0 < c \leq m$.

Examples of the atom of Group 13 are a boron atom, an aluminum atom, a gallium atom, an indium atom and a thallium atom. Among them, preferred is a boron atom or an aluminum atom, and more preferred is an aluminum atom.

Examples of the atom of Group 14 are a carbon atom, a silicon atom, a germanium atom, a tin atom and a lead atom. Among them, preferred is a silicon atom, a germanium atom or a tin atom, and more preferred is a silicon atom or a tin atom.

When $M^2$ is a silicon atom, for example, m is 4, and c is preferably 3 or 4.

Examples of $X^5$ are a fluorine atom, a chlorine atom, a bromine atom and an iodine atom. Among them, preferred is a chlorine atom.

Examples of the above-mentioned $R^{15}$ are an alkyl group such as a methyl group, an ethyl group, a n-propyl group, an isopropyl group, a n-butyl group, an isobutyl group, an amyl group, an isoamyl group, a hexyl group, a heptyl group, an octyl group, a decyl group and a dodecyl group; an aryl group such as a phenyl group, a tolyl group, a cresyl group, a xylyl group and a naphthyl group; a cycloalkyl group such as a cyclohexyl group and a cyclopentyl group; an allyl group such as a propenyl group; and an aralkyl group such as a benzyl group. Among them, preferred is an alkyl group or an aryl group; and more preferred is a methyl group, an ethyl group, a n-propyl group, a phenyl group or a p-tolyl group.

Examples of the above-mentioned halogen compound of Group 13 element are trichloroborane, methyldichloroborane, ethyldichloroborane, phenyldichloroborane, cyclohexyldichloroborane, dimethylchloroborane, methylethylchloroborane, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride and dimethylthallium chloride; and compounds obtained by replacing the chlorine atom contained in the above-exemplified compounds with a fluorine atom, a bromine atom or an iodine atom.

Examples of the above-mentioned halogen compound of Group 14 element are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-isobutyldichlorotin, diphenyldichlorotin, divinyldichlorotin, methyltrichlorotin, phenyltrichlorotin, dichlorolead, methylchlorolead and phenylchlorolead; and compounds obtained by replacing the chlorine atom contained in the above-exemplified compounds with a fluorine atom, a bromine atom or an iodine atom. Among them, preferred is tetrachlorosilane, methyltrichlorosilane, ethyltrichlorosilane, n-propyltrichlorosilane, n-butyltrichlorosilane, phenyltrichlorosilane, tetrachlorotin, methyltrichlorotin or n-butyltrichlorotin.

The halogenation compound (b) is preferably titanium tetrachloride, methyldichloroaluminum, ethyldichloroaluminum, tetrachlorosilane, phenyltrichlorosilane, methyltrichlorosilane, ethyltrichlorosilane, n-propyltrichlorosilane or tetrachlorotin, and particularly preferably titanium tetrachloride or tetrachlorosilane, from a viewpoint of a polymerization activity of an olefin copolymerization catalyst in the present invention.

The above-exemplified compounds as the halogenation compound (b) may be used in combination of two or more thereof.

Use of an internal electron donor (c) in the above-mentioned process (4) for producing the component (A) may improve a copolymerization activity or copolymerizability. Examples of the internal electron donor (c) are oxygen-containing electron donating compounds such as ethers, ketones, aldehydes, carboxylic acids, organic acid esters, inorganic acid esters, organic acid amides, inorganic acid amides and acid anhydrides; and nitrogen-containing electron donating compounds such as ammonia, amines, nitriles and isocyanates. Among them, preferred are organic acid esters and/or ethers, and more preferred are carboxylic acid esters and/or ethers.

Examples of the above-mentioned carboxylic acid esters of the internal electron donor (c) are monocarboxylic acid esters and polycarboxylic acid esters. More specific examples thereof are saturated aliphatic monocarboxylic acid esters, saturated aliphatic polycarboxylic acid esters, unsaturated aliphatic monocarboxylic acid esters, unsaturated aliphatic polycarboxylic acid esters, alicyclic monocarboxylic acid esters, alicyclic polycarboxylic acid esters, aromatic monocarboxylic acid esters, and aromatic polycarboxylic acid esters. Preferred are unsaturated aliphatic carboxylic acid esters such as methacrylic acid esters and maleic acid esters, or aromatic carboxylic acid esters such as benzoic acid esters and phthalic acid esters. Specific examples thereof are methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, and phthalic acid esters represented by the following formula [II]:

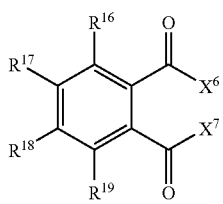

[II]

wherein $R^{16}$, $R^{17}$, $R^{18}$ and $R^{19}$ are independently of one another a hydrogen atom or a hydrocarbyl group; and $X^6$ and $X^7$ are independently of each other a group consisting of hydrogen atoms and carbon atoms, or a group consisting of hydrogen atoms, carbon atoms and one or more oxygen atoms contained in ether bonds.

$R^{16}$, $R^{17}$, $R^{18}$ and $R^{19}$ are preferably a hydrogen atom or a hydrocarbyl group having 1 to 10 carbon atoms, and two or more hydrocarbyl groups of $R^{16}$, $R^{17}$, $R^{18}$ and $R^{19}$ may be linked to one another to form a ring; $X^6$ and $X^7$ are preferably a hydroxyl group or an alkoxy group having 1 to 20 carbon atoms; and when an aromatic ring exits other than the $R^{16}$-$R^{19}$ carrying-benzene ring, the aromatic ring may be partially or totally hydrogenated.

The phthalic acid derivatives represented by the above formula are preferably phthalic acid dialkyl esters; and particularly preferably phthalic acid dialkyl esters, whose two alkyl groups have 8 or less carbon atoms in total. Examples of the phthalic acid derivatives are dimethyl phthalate, methyl ethyl phthalate, diethyl phthalate, di-n-propyl phthalate, diisopropyl phthalate, di-n-butyl phthalate, diisobutyl phthalate, dipentyl phthalate, di-n-hexyl phthalate, di-n-heptyl phthalate, diisoheptyl phthalate, di-n-octyl phthalate, di(2-ethylhexyl)phthalate, di-n-decyl phthalate, diisodecyl phthalate, dicyclohexyl phthalate, and diphenyl phthalate. Among them, preferred is diethyl phthalate, di-n-propyl phthalate, diisopropyl phthalate, di-n-butyl phthalate, or diisobutyl phthalate.

The above-exemplified carboxylic acid esters may be used in combination of two or more thereof, and two or more kinds of those carboxylic acid esters may be used in the above-mentioned process (4) for producing the component (A).

Examples of the above-mentioned ethers of the internal electron donor (c) are dialky ethers, cyclic ethers which are heterocyclic compounds having at least one ether bond (—C—O—C—) in their rings, and 1,3-diethers.

Examples of the dialky ethers are dimethyl ether, diethyl ether, di-n-propyl ether, diisopropyl ether, di-n-butyl ether, diisobutyl ether, methyl-n-propyl ether, methyl-n-butyl ether, ethyl-n-propyl ether, ethyl-n-butyl ether, and methyl cyclohexyl ether. Among them, preferred is di-n-butyl ether, which is hereinafter referred to as "dibutyl ether" or "butyl ether".

Examples of the above-mentioned cyclic ethers are ethylene oxide, propylene oxide, trimethylene oxide, tetrahydrofuran, 2,5-dimethoxytetrahydrofuran, tetrahydropyrane, hexamethylene oxide, 1,3-dioxepane, 1,3-dioxane, 1,4-dioxane, 1,3-dioxolane, 2-methyl-1,3-dioxolane, 2,2-dimethyl-1,3-dioxolane, 4-methyl-1,3-dioxolane, 2,4-dimethyl-1,3-dioxolane, furan, 2,5-dimethylfuran and s-trioxane. Among them, preferred are cyclic ethers containing at least one —C—O—C—O—C— bond in their rings.

Examples of the above-mentioned 1,3-diethers are those represented by the following formula [III]:

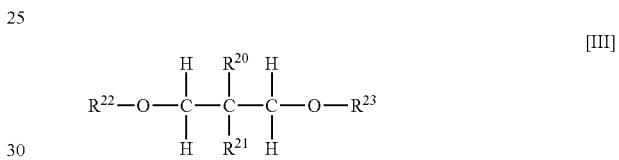

[III]

wherein $R^{20}$, $R^{21}$, $R^{22}$ and $R^{23}$ are independently of one another a $C_{1-20}$ linear alkyl group, a branched alkyl group, an alicyclic alkyl group, an aryl group or an aralkyl group, and $R^{20}$ and $R^{21}$ may be independently of each other a hydrogen atom, and may be linked to each other to form a ring.

Examples of the 1,3-diethers represented by the above formula [III] are 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, and 2-heptyl-2-pentyl-1,3-dimethoxypropane.

The above-exemplified ethers may be used in combination of two or more thereof, and two or more kinds of those ethers may be used in the above-mentioned process (4) for producing the component (A).

The organic acid halide (d) in the above-mentioned process (4) for producing the component (A) is preferably monocarboxylic acid halides or polycarboxylic acid halides. Examples thereof are aliphatic carboxylic acid halides, alicyclic carboxylic acid halides, and aromatic carboxylic acid halides. Specific examples thereof are acetyl chloride, propionic acid chloride, butylic acid chloride, valeric acid chloride, acrylic acid chloride, methacrylic acid chloride, benzoic acid chloride, toluic acid chloride, anisic acid chloride, succinic acid chloride, malonic acid chloride, maleic acid chloride, itaconic acid chloride, and phthalic acid chloride. Among them, preferred are aromatic monocarboxylic acid chlorides such as benzoic acid chloride and toluic acid chloride, or aromatic dicarboxylic acid dichlorides such as phthalic acid dichloride, further preferred are aromatic dicarboxylic acid dichlorides, and particularly preferred is phthalic acid dichloride.

The contacting step in the above-mentioned process (4) for producing the component (A) is carried out usually in an atmosphere of an inert gas such as nitrogen and argon. In the contacting step, examples of a method for adding the solid component (a), the halogenation compound (b), the electron donor (c) and the organic acid halide (d) are the following methods (1) to (10):

(1) a method comprising the step of adding the halogenation compound (b) and the internal electron donor (c), in an optional order, to the solid component (a);

(2) a method comprising the step of adding the halogenation compound (b) and the organic acid halide (d), in an optional order, to the solid component (a);

(3) a method comprising the step of adding a mixture of the halogenation compound (b), the internal electron donor (c) and the organic acid halide (d) to the solid component (a);

(4) a method comprising the step of adding (i) a mixture of the halogenation compound (b) and the internal electron donor (c), and (ii) the organic acid halide (d), in an optional order, to the solid component (a);

(5) a method comprising the steps of adding the internal electron donor (c) to the solid component (a), and then, adding the halogenation compound (b) thereto;

(6) a method comprising the steps of adding the internal electron donor (c) to the solid component (a), and then, adding the halogenation compound (b) and the additional internal electron donor (c) thereto, in an optional order;

(7) a method comprising the steps of adding the internal electron donor (c) to the solid component (a), and then, adding a mixture of the halogenation compound (b) and the additional internal electron donor (c) thereto;

(8) a method comprising the step of adding the solid component (a) and the internal electron donor (c), in an optional order, to the halogenation compound (b);

(9) a method comprising the step of adding the solid component (a) and the organic acid halide (d), in an optional order, to the halogenation compound (b); and

(10) a method comprising the step of adding the solid component (a), the internal electron donor (c) and the organic acid halide (d), in an optional order, to the halogenation compound (b).

The above methods (1) to (10) may be followed by one or more steps of adding the halogenation compound (b) or a mixture of the halogenation compound (b) and the internal electron donor (c)

Among them, preferred is the method (2); the method (4); the method (4) followed by one or more steps of adding a mixture of the halogenation compound (b) and the internal electron donor (c); or the method (7), wherein the second adding step of a mixture of the halogenation compound (b) and the internal electron donor (c) may be repeated. More preferred is the method (4); the method (4) followed by one or more steps of adding a mixture of the halogenation compound (b) and the internal electron donor (c); or the method (7), wherein the second adding step of a mixture of the halogenation compound (b) and the internal electron donor (c) may be repeated. Particularly preferred is the method (4) using an ether as the internal electron donor (c), followed by the step of adding a mixture of the halogenation compound (b) and the internal electron donor (c), wherein the internal electron donor (c) is a combination of a carboxylic acid ester and an ether, and further followed by one or more steps of adding a mixture of the halogenation compound (b) and the internal electron donor (c), wherein the internal electron donor (c) is an ether; or the method (7) using a carboxylic acid ester as the first internal electron donor (c), and using a combination of a carboxylic acid ester with an ether as the second internal electron donor (c), followed by one or more steps of adding a mixture of the halogenation compound (b) and the internal electron donor (c), wherein the internal electron donor (c) is an ether.

In the above-mentioned process (4) for producing the component (A), a method for contacting the solid component (a), the halogenation compound (b), the internal electron donor (c) and the organic acid halide (d) with one another is not particularly limited. Examples of the method are conventional methods such as a slurry method, and a mechanically pulverizing method using a ball mill. The mechanically pulverizing method is preferably carried out in the presence of a diluent, in order to suppress production of fine powders, thereby obtaining the component (A) having a narrow particle size distribution.

The above-mentioned diluent is preferably inert to the solid component (a), the halogenation compound (b), the electron donor (c) and the organic acid halide (d). Examples of the diluent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene. Among them, preferred are aliphatic hydrocarbons or aromatic hydrocarbons, more preferred are aromatic hydrocarbons, and further preferred is toluene or xylene.

The above-mentioned diluent is used in an amount of usually 0.1 to 1,000 mL, and preferably 1 to 100 mL, per one g of the solid component (a), per one contacting.

In the contacting step in the above-mentioned process (4) for producing the component (A), its time is not particularly limited, and is preferably 0.5 to 8 hours, and further preferably 1 to 6 hours. Its temperature is usually −50 to 150° C., preferably 0 to 140° C., and further preferably 60 to 135° C.

A product obtained in the contacting step is usually subjected to a washing step with an aromatic hydrocarbon solvent such as benzene, toluene, ethylbenzene and xylene. Among them, preferred is toluene or xylene. The aromatic hydrocarbon solvent is used in an amount of usually 0.1 to 1,000 mL, and preferably 1 to 100 mL, per one g of the product obtained in the contacting step, per one washing. A washing time is not particularly limited, and is preferably 1 to 120 minutes, more preferably 2 to 60 minutes, and further preferably 5 to 40 minutes.

The above-mentioned contacting and washing are carried out preferably under agitation, in order to maintain a homogeneous slurry state. Too week agitation may result in insufficient contacting or washing, and therefore, the obtained olefin copolymerization catalyst may be insufficient in its stereoregularity or polymerization activity. Too strong agitation may break the particulate product obtained in the contacting step.

From a viewpoint of stereoregularity or polymerization activity of the obtained olefin copolymerization catalyst, a liquid part of a mixture obtained in the contacting step, which liquid part usually contains the above-mentioned diluent, is preferably separated partially or almost totally from a target solid part, in order to remove sufficiently unreacted starting materials contained in the liquid part. Similarly, from the same viewpoint and for the same reason, a liquid part of a mixture obtained in the washing step, which liquid part usually contains the above-mentioned solvent, is preferably separated partially or almost totally from a target solid part.

Examples of a method for the separation are a filtration method with a filter, and a method comprising the step of precipitating a solid part, and then separating a clear supernatant liquid from the precipitated solid part.

The halogenation compound (b) is used in an amount of usually 0.5 to 1.000 mmol, preferably 1 to 200 mmol, and further preferably 2 to 100 mmol, per one gram of the solid component (a). The halogenation compound (b) is used preferably in combination with the electron donor (c), which is used in an amount of usually 1 to 100 mol, preferably 1.5 to 75 mol, and further preferably 2 to 50 mol, per one mol of the halogenation compound (b).

The internal electron donor (c) is used in an amount of usually 0.01 to 100 mmol, preferably 0.05 to 50 mmol, and further preferably 0.1 to 20 mmol, per one gram of the solid component (a).

The organic acid halide (d) is used in an amount of usually 0.1 to 100 mmol, preferably 0.3 to 50 mmol, and further preferably 0.5 to 20 mmol, per one gram of the solid component (a), and is used in an amount of usually 0.01 to 1.0 mol, and preferably 0.03 to 0.5 mol, per one mol of the magnesium atom contained in the solid component (a).

Use in an excessive amount of the internal electron donor (c) or the organic acid halide (d) may break the particulate product obtained in the contacting step.

When the halogenation compound (b), the internal electron donor (c) and the organic acid halide (d) are used more than once in the contacting step in the above-mentioned process (4) for producing the component (A), the above-mentioned used amounts thereof are per one-time use.

Examples of a type of usage for polymerization of the component (A), which is produced according to a process such as the above-mentioned processes (1) to (4), are a type of its slurry in an inert solvent, and a type of its fluid powder obtained by drying the wet component (A). Examples of a method for drying the wet component (A) are a reduced-pressure drying method, and a method comprising the step of removing volatile matters contained in the component (A) under a flow of an inert gas such as nitrogen and argon. The drying is carried out at preferably 0 to 200° C., and more preferably 50 to 100° C., and for preferably 0.01 to 20 hours, and more preferably 0.5 to 10 hours.

The component (B) in the present invention is a compound having one or more aluminum-carbon bonds in its molecule, and may be a compound known in the art. Examples thereof are compounds represented by the following formulas, respectively:

$$R^{24}{}_{w}AlX^{8}{}_{3-w}, \text{ and}$$

$$R^{25}R^{26}Al—O—AlR^{27}R^{28}$$

wherein $R^{24}$ to $R^{28}$ are independently of one another a hydrocarbyl group having 1 to 20 carbon atoms; $X^8$ is a halogen atom, a hydrogen atom or an alkoxy group; and w is a number satisfying $2 \leqq w \leqq 3$.

Examples of the component (B) are trialkylaluminums such as triethylaluminum, triisobutylaluminum and trihexylaluminum; dialkylaluminum hydrides such as diethylaluminum hydride and diisobutylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane.

Among them, preferred are trialkylaluminums, mixtures of trialkylaluminums with dialkylaluminum halides, or alkylalumoxanes; and particularly preferred is triethylaluminum, triisobutylaluminum, a mixture of triethylaluminum with diethylaluminum chloride, or tetraethyldialumoxane.

The components (A), (B) and (C) in the present invention may be combined with an external electron donor (D), respectively. Examples of the external electron donor (D) are oxygen-containing compounds, nitrogen-containing compounds, phosphorus-containing compounds and sulfur-containing compounds. Among them, preferred are oxygen-containing compounds or nitrogen-containing compounds.

Examples of the oxygen-containing compounds are alkoxysilicon compounds, ethers, esters and ketones. Among them, preferred are alkoxysilicon compounds or ethers.

Examples of the alkoxysilicon compounds are compounds represented by the following formula:

$$R^{29}{}_{r}Si(OR^{30})_{4-r}$$

wherein $R^{29}$ is a hydrocarbyl group having 1 to 20 carbon atoms, a hydrogen atom, or a hetero atom-containing group, and when plural $R^{29}$s exist, they are the same as, or different from one another; $R^{30}$ is a hydrocarbyl group having 1 to 20 carbon atoms, and when plural $R^{30}$ s exist, they are the same as, or different from one another; and r is a number satisfying $0 \leqq r < 4$.

Examples of the above-mentioned hydrocarbyl group of $R^{29}$ are a linear alkyl group such as a methyl group, an ethyl group, a propyl group, a butyl group and a pentyl group; a branched-chain alkyl group such as an isopropyl group, a sec-butyl group, a tert-butyl group and a tert-amyl group; a cycloalkyl group such as a cyclopentyl group and a cyclohexyl group; a cycloalkenyl group such as a cyclopentenyl group; and an aryl group such as a phenyl group and a tolyl group.

The compounds represented by the above formula are preferably compounds having at least one hydrocarbyl group of $R^{29}$ which contains a secondary or tertiary carbon atom linked to the silicon atom.

Examples of the hetero atom contained in the above-mentioned hetero atom-containing group of $R^{29}$ are an oxygen atom, a nitrogen atom, a sulfur atom and a phosphorus atom. Examples of the hetero atom-containing group are a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group and a thienyl group. Among them, preferred are hetero atom-containing groups, whose hetero atom is directly linked to the silicon atom.

Examples of the above-mentioned alkoxysilicon compounds as the oxygen-containing compounds are diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, tert-butylisopropyldimethoxysilane, dicyclobutyldimethoxysilane, cyclobutylisopropyldimethoxysilane, cyclobutylisobutyldimethoxysilane, cyclobutyl-tert-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicylohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, diethylaminodimethoxysilane, and diethylaminodiethoxysilane.

Examples of the ethers of the above-mentioned oxygen-containing compounds are those exemplified above as the cyclic ethers or the 1,3-diethers of the internal electron donor (c).

Examples of the nitrogen-containing compounds of the above-mentioned external electron donor (D) are 2,6-substituted piperidines such as 2,6-dimethylpiperidine and 2,2,6,6-tetramethylpiperidine; substituted methylene diamines such as 2,5-substituted piperidines, N,N,N',N'-tetramethylmethylene diamine and N,N,N',N'-tetraethylmethylene diamine; and substituted imidazolidines such as 1,3-dibenzylimidazolidine. Among them, preferred are 2,6-substituted piperidines.

The external electron donor (D) is particularly preferably cyclohexylmethyldimethoxysilane, cyclohexylethyldimethoxysilane, diisopropyldimethoxysilane, tert-butylethyldimethoxysilane, tert-butyl-n-propyldimethoxysilane, phenyldimethoxysilane, diphenyldimethoxysilane, dicyclobutyldimethoxysilane, dicyclopentyldimethoxysilane, 1,3-dioxolane, 1,3-dioxane, 2,6-dimethylpiperidine, 2,2,6,6-tetramethylpiperidine, 2-isopropyl-2-isobutyl-1,3-dimethoxypropane, 2-isopropyl-2-isopentyl-1,3-dimethoxypropane, 2,2-diisobutyl-1,3-dimethoxypropane, 2,2-diisopropyl-1,3-dimethoxypropane or 2,2-dicyclohexyl-1,3-dimethoxypropane.

The olefin in the present invention means ethylene or α-olefins having at least three carbon atoms. Examples of the α-olefins are linear mono-olefins such as propylene, 1-butene, 1-pentene, 1-hexene, 1-heptene, 1-octene and 1-decene; branched-chain mono-olefins such as 3-methyl-1-butene, 3-methyl-1-pentene and 4-methyl-1-pentene; and vinylcyclohexane. The present invention uses a combination of two or more kinds of olefins. The olefins may be used in combination with monomers containing plural unsaturated bonds, such as conjugated dienes and non-conjugated dienes.

The above-mentioned combination of two or more kinds of olefins in present invention is preferably a combination of ethylene/α-olefin; more preferably a combination of ethylene/linear α-olefin; further preferably a combination of ethylene/propylene, ethylene/1-butene, ethylene/1-hexene, or ethylene/1-octene; particularly preferably a combination of ethylene/propylene or ethylene/1-butene; and most preferably a combination of ethylene/propylene.

The olefin copolymer in the present invention is preferably ethylene-α-olefin copolymers; more preferably ethylene-linear α-olefin copolymers; further preferably ethylene-propylene copolymers, ethylene-1-butene copolymers, ethylene-1-hexene copolymers, ethylene-1-octene copolymers, propylene-1-butene copolymers, or propylene-1-hexene copolymers; particularly preferably ethylene-propylene copolymers or ethylene-1-butene copolymers; and most preferably ethylene-propylene copolymers.

The above-mentioned ethylene-α-olefin copolymers contain ethylene units in an amount of usually 10 to 90% by mol, preferably 30 to 80% by mol, and more preferably 40 to 75% by mol, wherein a total amount of ethylene units and α-olefin units is 100% by mol. The above-mentioned term "unit" means a polymerized unit of a monomer such as ethylene and an α-olefin.

The above-mentioned "random olefin copolymer having excellent randomness" means an olefin copolymer whose two or more kinds of olefin units have a sequence of a nearly statistically-high randomness (monomer sequence distribution). An index of the randomness is, for example, a product of a monomer reactivity ratio, which is disclosed in a literature such as J. Polymer Science, B1 359 (1963) authored by S. Igarashi, and Makromol. Chem., 108, 307 (1967) authored by C. Tosi. When copolymerizing two kinds of olefins ($M_1$ and $M_2$) with each other, a product of a monomer reactivity ratio is represented by $r_1 r_2$, wherein $r_1$ is an relative reactivity of $M_1$ with $M_2$, provided that a growing end of an olefin copolymer has an $M_1$ unit, and $r_2$ is an relative reactivity of $M_2$ with $M_1$, provided that a growing end of an olefin copolymer has an $M_2$ unit. When the product ($r_1 r_2$) is smaller than 1, $M_1$ and $M_2$ tend to be incorporated alternately into a main chain of an olefin copolymer. When the product ($r_1 r_2$) is larger than 1, each of $M_1$ and $M_2$ tends to be incorporated continuously into a main chain of an olefin copolymer. A copolymerization having a product ($r_1 r_2$) of 1 is particularly referred to as an ideal copolymerization, and $M_2$ units and $M_1$ units are distributed completely randomly in an olefin copolymer; namely, the closer to 1 the product ($r_1 r_2$) is, the higher the randomness is. The product ($r_1 r_2$) in the present invention is preferably 1.0 to 3.0, more preferably 1.0 to 2.5, further preferably 1.0 to 2.0, and particularly preferably 1.0 to 1.5.

In the present invention, another step of homopolymerizing propylene may be carried out before the above-mentioned step of contacting two or more kinds of olefins with an olefin copolymerization catalyst. In such a tow step-combined copolymerization, which is referred to as a heteroblock copolymerization in this technical field, the latter contacting step is carried out in the presence of the propylene homopolymer produced in another former step.

A method for contacting the components (A), (B) and (C) is not limited. Examples of the method are (1) a method comprising the steps of (1-1) contacting the components (A), (B) and (C) with one another in the presence or absence of a solvent, and then (1-2) feeding the obtained contact substance to a polymerization reactor, and (2) a method comprising the step of feeding the components (A), (B) and (C) separately to a polymerization reactor, thereby contacting those components with one another in the polymerization reactor. In the method (2), it is preferable to feed the components (A), (B) and (C) to the polymerization reactor in a water-free state and in an atmosphere of an inert gas such as nitrogen and argon, wherein it is allowed to contact any two components of the components (A), (B) and (C) with each other prior to feeding them to the polymerization reactor.

The process for producing an olefin copolymer of the present invention uses the component (A) without modification, or with modification. The modification of the component (A) means polymerization of a small amount of olefins in the presence of the component (A). The so-obtained modified component (A) has a small amount of olefin polymers on its surface. In this technical field, the modified component (A) is referred to as a "pre-polymerized catalyst component"; the above-mentioned olefin polymer is referred to as a "pre-polymer"; and the above-mentioned polymerization of a small amount of olefins in the presence of the component (A) is referred to as "pre-polymerization". In contrast, polymerization carried out in the process for producing an olefin copolymer of the present invention is referred to as "real polymerization".

The pre-polymerized catalyst component is preferably produced by slurry polymerization of a small amount of olefins in the presence of the components (A) and (B). Examples of a solvent used for the slurry polymerization are inert hydrocarbon solvents such as propane, butane, isobutane, pentane, isopentane, hexane, heptane, octane, cyclohexane, benzene and toluene. A partial or total amount of the inert hydrocarbon solvents may be replaced with liquid olefins.

The component (B) in the pre-polymerization is used in an amount of usually 0.5 to 700 mol, preferably 0.8 to 500 mol, and particularly preferably 1 to 200 mol, per one gram atom of a titanium atom contained in the component (A) used.

The olefins are pre-polymerized in an amount of usually 0.01 to 1,000 g, preferably 0.05 to 500 g, and particularly preferably 0.1 to 200 g, per 1 g of the component (A) used.

The above-mentioned slurry polymerization has a slurry concentration of preferably 1 to 500 g-component (A)/liter-solvent, and particularly preferably 3 to 300 g-component (A)/liter-solvent.

The pre-polymerization is carried out at preferably −20 to 100° C., and particularly preferably 0 to 80° C. A partial pressure of olefins contained in a gas phase of the pre-polymerization is preferably 1 kPa to 2 MPa, and particularly preferably 10 kPa to 1 MPa, except olefins which are liquid under pre-polymerization pressure and temperature. A pre-polymerization time is not particularly limited, and is preferably 2 minutes to 15 hours.

Examples of a method for supplying the components (A) and (B) and olefins to a pre-polymerization reactor are (1) a method comprising the steps of (1-1) supplying the components (A) and (B), and then (1-2) supplying the olefins, and (2) a method comprising the steps of (2-1) supplying the component (A) and the olefins, and then (2-2) supplying the component (B). Examples of a method for supplying the olefins to the pre-polymerization reactor are (1) a method comprising the step of supplying the olefins one after another while keeping an inner pressure of the reactor at a predetermined pressure, and (2) a method comprising the step of supplying the predetermined total amount of the olefins at the beginning. In order to control a molecular weight of an obtained pre-polymer, a chain transfer agent such as hydrogen may be added to a pre-polymerization reactor.

The pre-polymerization may use a partial or total amount of the component (C) to be used in the above-mentioned real polymerization, or may use a partial or total amount of the component (D) to be optionally used therein, in an amount of usually 0.01 to 400 mol, preferably 0.02 to 200 mol, and particularly preferably 0.03 to 100 mol, per one gram atom of a titanium atom contained in the component (A) used, or in an amount of usually 0.003 to 5 mol, preferably 0.005 to 3 mol, and particularly preferably 0.01 to 2 mol, per 1 mol of the component (B) used.

In the pre-polymerization, a method for supplying the component (C) or (D) to the pre-polymerization reactor is not particularly limited. Examples of the method are (1) a method comprising the step of supplying the component (C) or (D) thereto separately from the component (B), and (2) a method comprising the steps of (i) contacting the component (C) or (D) with the component (B) to form a contact substance, and then (ii) supplying the contact substance to the pre-polymerization reactor. The olefins used for the pre-polymerization are the same as, or different from those used for the real polymerization.

The component (B) in the real polymerization is used in an amount of usually 1 to 1,000 mol, and particularly preferably 5 to 600 mol, per one mol of a titanium atom contained in the component (A) used.

The component (C) in the real polymerization is used in an amount of usually 0.1 to 2,000 mol, preferably 0.3 to 1,000 mol, and particularly preferably 0.5 to 800 mol, per one mol of a titanium atom contained in the component (A) used, or in an amount of usually 0.001 to 5 mol, preferably 0.005 to 3 mol, and particularly preferably 0.01 to 1 mol, per 1 mol of the component (B) used.

The real polymerization is carried out:

(1) at usually −30 to 300° C., and preferably 20 to 180° C.;

(2) under a pressure, which is not particularly limited, of usually an atmospheric pressure to 10 MPa, and preferably 200 kPa to 5 MPa, from an industrial and economical point of view;

(3) according to a batchwise method or a continuous method; and (4) according to (4-1) a slurry or solution polymerization method with an inert hydrocarbon solvent such as propane, butane, isobutane, pentane, hexane, heptane and octane, (4-2) a bulk polymerization method using an olefin as a solvent, which olefin is liquid at a polymerization temperature, or (4-3) a gas-phase polymerization method.

In order to control a molecular weight of an olefin copolymer produced, a chain transfer agent such as hydrogen may be used.

An olefin copolymer having excellent randomness, which can be produced according to the process of the present invention, can be used as a modifier for other olefin polymers; for example, the olefin copolymer is blended with an olefin polymer such as polypropylene, thereby obtaining a polymer composition having an excellent impact resistance.

EXAMPLE

The present invention is explained in more detail with reference to the following Examples, which do not limit the present invention.

Example 1

(1) Preparation of Solid Component (a)

A cylindrical reactor having an inner diameter of 0.5 meter and an inner volume of 200 liters, and equipped with a stirrer was purged with nitrogen, the cylindrical reactor being disclosed in JP 2002-187909A. There were put 54 liters of hexane, 100 g of diisobutyl phthalate (ester compound (iv)), 20.6 kg of tetraethoxysilane (organosilicon compound (i)) and 2.23 kg of tetra-n-butoxytitanium (titanium compound (ii)) into the reactor, and the resultant mixture was stirred. To the mixture, 51 liters of a dibutyl ether solution (concentration: 2.1 mol/liter) of butylmagnesium chloride (organomagnesium compound (iii)) were added dropwise at 7° C. over 4 hours under stirring at a rotating speed of 150 rpm. After completion of the dropwise addition, the mixture was stirred at 20° C. for one hour. The obtained reaction mixture was filtered to separate a solid. The separated solid was washed three times at room temperature with each 70 liters of toluene. A part of the washed solid was further washed three times with hexane, and was dried in vacuo, thereby obtaining a solid component. The solid component contained 1.9% by weight of a titanium atom, 35.6% by weight of an ethoxy group, and 3.5% by weight of a butoxy group, the solid component being 100% by weight. To the toluene-washed solid mentioned above, 40 liters of toluene were added, thereby obtaining its toluene slurry.

(2) Preparation of Solid Catalyst Component (A)

Another cylindrical reactor having the same inner diameter and inner volume as those mentioned above, and equipped with a stirrer was purged with nitrogen. The total amount of the above-obtained toluene slurry was transferred to the reactor, and its supernatant toluene was taken out till the slurry volume was decreased to 49.7 liters. The slurry was stirred at 80° C. for one hour, and was cooled down to 40° C. or lower. To the slurry, a mixture of 30 liters of titanium tetrachloride (halogenation compound (b)) with 1.16 kg of dibutyl ether (electron donor (c)) was added, and then, 4.23 kg of phthalic acid dichloride (organic acid halide (d)) were further added thereto. The mixture was heated up to 110° C., and was stirred at 110° C. for 3 hours. The obtained reaction mixture was filtered to separate a solid. The separated solid was washed three times at 95° C. with each 90 liters of toluene.

To the washed solid, 40 liters of toluene were added to obtain its toluene slurry. After the toluene slurry was allowed to stand, its supernatant toluene was taken out till the slurry volume was decreased to 49.7 liters. A mixture of 15 liters of titanium tetrachloride (halogenation compound (b)) 1.16 kg of dibutyl ether (electron donor (c)) and 0.87 kg of diisobutyl phthalate (electron donor (c)) was further added to the toluene slurry under stirring. The mixture was heated up to 105° C., and was stirred at 105° C. for one hour. The obtained reaction mixture was filtered to separate a solid. The separated solid was washed two times at 95° C. with each 90 liters of toluene.

To the washed solid, 40 liters of toluene were added to obtain its toluene slurry. After the toluene slurry was allowed to stand, its supernatant toluene was taken out till the slurry volume was decreased to 49.7 liters. A mixture of 15 liters of titanium tetrachloride (halogenation compound (b)) with 1.16 kg of dibutyl ether (electron donor (c)) was added to the toluene slurry under stirring. The mixture was heated up to 105° C., and was stirred at 105° C. for one hour. The obtained reaction mixture was filtered to separate a solid. The separated solid was washed two times at 95° C. with each 90 liters of toluene.

To the washed solid, 40 liters of toluene were added to obtain its toluene slurry. After the toluene slurry was allowed to stand, its supernatant toluene was taken out till the slurry volume was decreased to 49.7 liters. A mixture of 15 liters of titanium tetrachloride (halogenation compound (b)) with 1.16 kg of dibutyl ether (electron donor (c)) was added to the toluene slurry under stirring. The mixture was heated up to 105° C., and was stirred at 105° C. for one hour. The obtained reaction mixture was filtered to separate a solid. The separated solid was washed three times at 95° C. with each 90 liters of toluene, and was further washed two times with each 90 liters of hexane. The washed solid was dried at 105° C. for 2.5 hours under a stream of a nitrogen gas, thereby obtaining a solid catalyst component. The solid catalyst component contained 2.2% by weight of a titanium atom and 9.4% by weight of components of phthalic acid ester compound, the total amount of the solid catalyst component being 100% by weight.

(3) Preparation of Ethylene-Propylene Copolymer

There were put 100 g of sodium chloride into a one liter-stainless steel autoclave equipped with a stirrer. The autoclave was dried at 80° C. under a reduced pressure. The autoclave was filled with argon (ordinary pressure), and then, was heated up to 60° C. Hydrogen was added to the autoclave till its total pressure in the autoclave reached 0.02 MPa, then, propylene was added thereto till the total pressure in the autoclave reached 0.21 MPa, and then, a mixed gas of ethylene with propylene was added thereto till the total pressure in the autoclave reached 0.71 MPa, wherein the mixed gas contained ethylene in an amount of 40.0% by weight, the total amount of the mixed gas being 100.0% by weight.

A mixture of 10 mL of pentane, 1 mL (1.0 mmol as triethylaluminum) of a hexane solution (concentration: 1.0 mmol/mL) of triethylaluminum (component (B)), 1.75 mL (0.10 mmol as 2,6-dichloropyridine) of a heptane solution (concentration: 0.057 mmol/mL) of 2,6-dichloropyridine (component (C)), and 13.5 mg of the solid catalyst component (component (A)) prepared in Example 1(2) was pressed into the autoclave with argon gas, thereby initiating the polymerization. While maintaining 0.71 MPa total pressure in the autoclave, the above-mentioned mixed gas of ethylene with propylene was added thereto continuously, thereby copolymerizing ethylene with propylene at 65° C. for 95 minutes under stirring.

The polymerization reaction mixture was taken out of the autoclave. About one liter of purified water was added to the polymerization reaction mixture, and the resultant mixture was stirred for one hour. The mixture was filtered to separate a copolymer, which was vacuum-dried, thereby obtaining 42 g of an ethylene-propylene copolymer. Polymerization activity per hour was 1,960 g-copolymer/g-catalyst/hr, and the product of a reactivity ratio of ethylene and propylene, $r_1r_2$, was 2.13. The copolymer had an ethylene unit content of 37.6% by weight, the total amount of ethylene units and propylene units being 100% by weight; an intrinsic viscosity, [η], of 1.68 dl/g; an amount of soluble parts in xylene at 20° C. (CXS) of 79.4% by weight, the total amount of the copolymer being 100% by weight; a crystallization heat (ΔHc) of 3.6 J/g; and a glass transition temperature (Tg) of −44.8° C. Results are summarized in Table 1.

The above-mentioned titanium atom content (% by weight) was measured according to a method comprising the steps of:

(1) decomposing about 20 mg of a sample with one normal sulfuric acid (1N $H_2SO_4$);

(2) adding 3 mL (excess amount) of a hydrogen peroxide aqueous solution (concentration: 3% by weight) thereto to obtain a liquid sample;

(3) measuring a 410 nm characteristic absorption of the liquid sample with a double beam spectrophotometer, U-2001, manufactured by Hitachi, Ltd.; and (4) finding a titanium atom content from the measurements of the characteristic absorption by use of a calibration curve prepared in advance.

The above-mentioned alkoxy group content (% by weight) was measured according to a method comprising the steps of:

(1) decomposing about 2 g of a sample with 100 mL of water to obtain a liquid sample;

(2) measuring an amount of an alcohol (corresponding to an alkoxy group) contained in the liquid sample according to a gas chromatography internal standard method; and (3) converting the obtained amount of an alcohol to an alkoxy group content.

The above-mentioned carboxylic acid ester content (% by weight) was measured according to a method comprising the steps of:

(1) decomposing 0.3 g of a sample with 100 mL of water;

(2) extracting soluble parts contained therein with N,N-dimethylacetamide; and (3) measuring a content of a carboxylic acid ester contained in the extract according to a gas chromatography internal standard method.

The above-mentioned ethylene unit content (% by weight) was measured according to a $^{13}$C-NMR method under the following conditions, based on disclosures in Journal of Applied Polymer Science, Volume 42, pages 399-408 (1991/USA) authored by M. De Pooter et al:

instrument: JNM-EX270 manufactured by JEOL LTD,
probe diameter: 10 mmΦ,
solvent: o-dichlorobenzene,
temperature: 135° C.,
sample concentration: 5% by weight,
pulse width: 45,
repetition time: 10 seconds, and
integrating frequency: 2,500 times.

The above-mentioned product of a reactivity ratio of ethylene and propylene, $r_1r_2$, was obtained according to a method comprising the steps of:

(1) measuring a micro-structure of a copolymer according to a $^{13}$C-NMR method under conditions similar to those mentioned above; and (2) calculating according to disclosures in Macromolecules, Volume 15, pages 1150-1152 (1982/USA) authored by Kakugo et al.

The above-mentioned intrinsic viscosity, [1], was measured at 135° C. using an Ubbellohde viscometer in TETRALINE (tetrahydronaphthalene) as a solvent.

The above-mentioned amount of soluble parts in xylene at 20° C. (CXS) was measured according to a method comprising the steps of:

(1) dissolving 1 g of sample in 200 mL of boiling xylene,
(2) cooling the solution gradually down to 50° C.,
(3) further cooling the solution under stirring in an ice-water bath down to 20° C.,
(4) allowing the solution to stand at 20° C. for 3 hours, thereby precipitating a copolymer,
(5) filtering off the precipitated copolymer, thereby obtaining a filtrate, and
(6) measuring the amount of the copolymer dissolved in the filtrate, which copolymer is the above-mentioned soluble parts in xylene at 20° C.

The larger the CXS value is, the smaller crystallinity the copolymer has, which copolymer contains such a large amount of rubbery copolymers that it is preferable from a viewpoint of impact resistance.

The above-mentioned crystallization heat, ΔHc, was measured with a differential scanning calorimeter, DSC Q100, manufactured by TA Instruments Inc., according to a method comprising the steps of:

(1) melting about 10 mg of a sample at 200° C. in an atmosphere of nitrogen;
(2) keeping the sample at 200° C. for 5 minutes;
(3) cooling the sample down to −90° C. at a rate of 10° C./minute, thereby obtaining an exothermic peak; and
(4) measuring ΔHc (J/g-sample) from the exothermic peak.

The above-mentioned glass transition temperature, Tg, was measured with the above-mentioned differential scanning calorimeter, according to a method comprising the steps of:

(1) melting about 10 mg of a sample at 200° C. in an atmosphere of nitrogen;
(2) keeping the sample at 200° C. for 5 minutes;
(3) cooling the sample down to −90° C. at a rate of 10° C./minute;
(4) heating the sample up to 200° C. at a rate of 10° C./minute, thereby obtaining an endothermic curve; and
(5) measuring Tg from the endothermic curve.

Comparative Example 1

Example 1(3) was repeated except that (1) the component (C) was changed to 1.75 mL (0.10 mmol as 2,6-lutidine) of a heptane solution (concentration: 0.057 mmol/mL) of 2,6-lutidine, (2) the amount of the solid catalyst component (component (A)) was changed to 8.79 mg, and (3) the copolymerization time was changed from 95 minutes to 112 minutes, thereby obtaining 16 g of an ethylene-propylene copolymer. Polymerization activity per hour was 980 g-copolymer/g-catalyst/hr, and the product of a reactivity ratio of ethylene and propylene, $r_1r_2$, was 2.42. The copolymer had an ethylene unit content of 46.4% by weight, the total amount of ethylene units and propylene units being 100% by weight; an intrinsic viscosity, [n], of 1.78 dl/g; an amount of soluble parts in xylene at 20° C. (CXS) of 64.9% by weight, the total amount of the copolymer being 100% by weight; a crystallization heat (ΔHc) of 7.6 J/g; and a glass transition temperature (Tg) of −48.5° C. Results are summarized in Table 1.

Example 2

A 3 liter-stainless steel autoclave equipped with a stirrer was cooled down to 5° C. or lower. Its inner pressure was reduced, and then, 1 liter of heptane, hydrogen (0.04 MPa) and 150 g of propylene were added to the inner pressure-reduced autoclave. The autoclave was closed and heated up to 65° C., and then, ethylene was introduced thereto at 65° C. so that its partial pressure reached 0.20 MPa. A mixture of 10 mL of pentane, 2.6 mL (2.6 mmol as triethylaluminum) of a hexane solution (concentration: 1.0 mmol/mL) of triethylaluminum (component (B)), 4.6 mL (0.26 mmol as 2,6-dichloropyridine) of a heptane solution (concentration: 0.057 mmol/mL) of 2,6-dichloropyridine (component (C)), and 3.76 mg of the solid catalyst component (component (A)) prepared in Example 1(2) was pressed into the autoclave with argon gas, thereby initiating the polymerization. While maintaining 0.20 MPa of the ethylene partial pressure, ethylene was added thereto continuously, thereby copolymerizing ethylene with propylene at 65° C. for 30 minutes under stirring. Ethanol was pressed into the autoclave with argon gas, thereby terminating the polymerization.

The polymerization reaction mixture was poured into ethanol containing a small amount of hydrochloric acid, thereby precipitating a copolymer. The copolymer was filtered off, and was vacuum-dried, thereby obtaining 50 g of an ethylene-propylene copolymer. Polymerization activity per hour was 27,000 g-copolymer/g-catalyst/hr, and the product of a reactivity ratio of ethylene and propylene, $r_1r_2$, was 1.21. The copolymer had an ethylene unit content of 61.0% by weight, the total amount of ethylene units and propylene units being 100% by weight; an intrinsic viscosity, $[\eta]$, of 1.63 dl/g; an amount of soluble parts in xylene at 20° C. (CXS) of 85.2% by weight, the total amount of the copolymer being 100% by weight; a crystallization heat ($\Delta$Hc) of 6.8 J/g; and a glass transition temperature (Tg) of –54.5° C. Results are summarized in Table 2.

Comparative Example 2

Example 2 was repeated except that (1) the component (C) was changed to 4.6 mL (0.26 mmol as 2,6-lutidine) of a heptane solution (concentration: 0.057 mmol/mL) of 2,6-lutidine, and (2) the amount of the solid catalyst component (component (A)) was changed to 3.70 mg, thereby obtaining 13 g of an ethylene-propylene copolymer. Polymerization activity per hour was 6,800 g-copolymer/g-catalyst/hr, and the product of a reactivity ratio of ethylene and propylene, $r_1r_2$, was 1.50. The copolymer had an ethylene unit content of 60.1% by weight, the total amount of ethylene units and propylene units being 100% by weight; an intrinsic viscosity, [?], of 2.09 dl/g; an amount of soluble parts in xylene at 20° C. (CXS) of 80.5% by weight, the total amount of the copolymer being 100% by weight; a crystallization heat ($\Delta$Hc) of 11.5 J/g; and a glass transition temperature (Tg) of –53.1° C. Results are summarized in Table 2.

Example 3

Example 2 was repeated except that (1) the ethylene partial pressure, 0.20 MPa, was changed to 0.10 MPa, and (2) the amount of the solid catalyst component (component (A)) was changed to 1.91 mg, thereby obtaining 17 g of an ethylene-propylene copolymer. Polymerization activity per hour was 18,000 g-copolymer/g-catalyst/hr, and the product of a reactivity ratio of ethylene and propylene, $r_1r_2$, was 1.18. The copolymer had an ethylene unit content of 54.8% by weight, the total amount of ethylene units and propylene units being 100% by weight; an intrinsic viscosity, $[\eta]$, of 1.33 dl/g; an amount of soluble parts in xylene at 20° C. (CXS) of 90.3% by weight, the total amount of the copolymer being 100% by weight; a crystallization heat ($\Delta$Hc) of 4.3 J/g; and a glass transition temperature (Tg) of –54.1° C. Results are summarized in Table 2.

Example 4

Example 2 was repeated except that (1) hydrogen was not added, and (2) the amount of the solid catalyst component (component (A)) was changed to 5.42 mg, thereby obtaining 22 g of an ethylene-propylene copolymer. Polymerization activity per hour was 8,000 g-copolymer/g-catalyst/hr, and the product of a reactivity ratio of ethylene and propylene, $r_1r_2$, was 1.19. The copolymer had an ethylene unit content of 34.9% by weight, the total amount of ethylene units and propylene units being 100% by weight; an intrinsic viscosity, $[\eta]$, of 1.82 dl/g; an amount of soluble parts in xylene at 20° C. (CXS) of 100% by weight, the total amount of the copolymer being 100% by weight; a crystallization heat ($\Delta$Hc) of 6.05 J/g; and a glass transition temperature (Tg) of –44.7° C. Results are summarized in Table 2.

Example 5

(1) Preparation of Solid Catalyst Component (A)

There were put 7.18 g of anhydrous $MgCl_2$-4N manufactured by KOJUNDO CHEMICAL LABORATORY CO., LTD., 37.7 mL of n-decane, and 35.3 mL of 2-ethylhexylalcohol in a 200 mL-flask. The mixture was heated up to 130° C., and was maintained at 130° C. for 2 hours. The mixture was allowed to stand at room temperature for 10 minutes, and then, 1.79 g of anhydrous phthalic acid was added thereto. The resultant mixture was stirred at 130° C. for one hour, and then, was cooled down to room temperature, thereby obtaining a solution.

There were put 200 mL of titanium tetrachloride in a 1,000 mL-flask equipped with a stirrer, and it was cooled down to –20° C. While stirring it at –20° C. at a rate of 250 rpm, the above-obtained solution was added thereto dropwise over 75 minutes with a 100 mL-dropping funnel. The resultant mixture was heated up to room temperature at a rate of 5.5° C./10 minutes. The mixture was further heated up to 110° C., and then, 5.06 mL of diisobutyl phthalate were added thereto, and the resultant mixture was stirred at 110° C. for 2 hours. The mixture was subjected to hot filtration to obtain a solid, and 277 mL of titanium tetrachloride were added to the solid, and the resultant mixture was stirred at 110° C. for 2 hours. The mixture was subjected to hot filtration to obtain a solid, and the solid was washed two times with each 50 mL of n-decane at 110° C. There were added 50 mL of n-decane to the washed solid, and the resultant mixture was heated up to 110° C. The mixture was subjected to hot filtration to obtain a solid, and the solid was washed two times with each 50 mL of n-decane at 110° C., and then, was further washed three times with each 50 mL of n-hexane, thereby obtaining a solid. The solid was dried in vacuo at 40° C., thereby obtaining a solid catalyst component.

(2) Preparation of Ethylene-Propylene Copolymer

There were put 100 g of sodium chloride into a one liter-stainless steel autoclave equipped with a stirrer. The autoclave was dried at 80° C. under a reduced pressure. The autoclave was filled with argon (ordinary pressure), and then, was heated up to 60° C. Hydrogen was added to the autoclave till its total pressure in the autoclave reached 0.02 MPa, then, propylene was added thereto till the total pressure in the autoclave reached 0.21 MPa, and then, a mixed gas of ethylene with propylene was added thereto till the total pressure in the autoclave reached 0.71 MPa, wherein the mixed gas contained ethylene in an amount of 40.0% by weight, the total amount of the mixed gas being 100.0% by weight.

A mixture of 10 mL of pentane, 1 mL (1.0 mmol as triethylaluminum) of a hexane solution (concentration: 1.0 mmol/mL) of triethylaluminum (component (B)), 1.75 mL (0.10 mmol as 2,6-dichloropyridine) of a heptane solution (concentration: 0.057 mmol/mL) of 2,6-dichloropyridine (component (C)), and 11.4 mg of the solid catalyst component (component (A)) prepared in Example 5(1) was pressed into the autoclave with argon gas, thereby initiating the polymerization. While maintaining 0.71 MPa total pressure in the autoclave, the above-mentioned mixed gas of ethylene with pro pylene was added thereto continuously, thereby copolymerizing ethylene with propylene at 65° C. for 180 minutes under stirring.

The polymerization reaction mixture was taken out of the autoclave. About one liter of purified water was added to the polymerization reaction mixture, and the resultant mixture was stirred for one hour. The mixture was filtered to separate a copolymer, which was vacuum-dried, thereby obtaining 22 g of an ethylene-propylene copolymer. Polymerization activity per hour was 645 g-copolymer/g-catalyst/hr, and the product of a reactivity ratio of ethylene and propylene, $r_1 r_2$, was 1.76. The copolymer had an ethylene unit content of 47.0% by weight, the total amount of ethylene units and propylene units being 100% by weight; an intrinsic viscosity, $[\eta]$, of 1.75 dl/g; an amount of soluble parts in xylene at 20° C. (CXS) of 82.2% by weight, the total amount of the copolymer being 100% by weight; a crystallization heat ($\Delta Hc$) of 2.6 J/g; and a glass transition temperature (Tg) of −51.3° C. Results are summarized in Table 3.

TABLE 1

|  | Example 1 | Comparative Example 1 |
|---|---|---|
| Polymerization condition |  |  |
| Amount of component (A) (mg) | 13.5 | 8.79 |
| Component (C) |  |  |
| Kind | 2,6-dichloropyridine | 2,6-lutidine |
| Amount (mmol) | 0.10 | 0.10 |
| Polymerization time (minute) | 95 | 112 |
| Result |  |  |
| Polymerization activity (g-copolymer/g-catalyst/hr) | 1960 | 980 |
| $r_1 r_2$ | 2.13 | 2.42 |
| Ethylene unit content (% by weight) | 37.6 | 46.4 |
| $[\eta]$ (dl/g) | 1.68 | 1.78 |
| CXS (% by weight) | 79.4 | 64.9 |
| $\Delta Hc$ (J/g) | 3.6 | 7.6 |
| Tg (° C.) | −44.8 | −48.5 |

TABLE 2

|  | Example | | | Comparative Example |
|---|---|---|---|---|
|  | 2 | 3 | 4 | 2 |
| Polymerization condition |  |  |  |  |
| Amount of component (A) (mg) | 3.76 | 1.91 | 5.42 | 3.70 |
| Component (C) |  |  |  |  |
| Kind (Note) | 2,6-DCP | 2,6-DCP | 2,6-DCP | 2,6-lutidine |
| Amount (mmol) | 0.26 | 0.26 | 0.26 | 0.26 |
| Ethylene partial pressure (MPa) | 0.20 | 0.10 | 0.20 | 0.20 |
| Hydrogen partial pressure (MPa) | 0.04 | 0.04 | 0.00 | 0.04 |
| Result |  |  |  |  |
| Polymerization activity (g-copolymer/g-catalyst/hr) | 27,000 | 18,000 | 8,000 | 6,800 |
| $r_1 r_2$ | 1.21 | 1.18 | 1.19 | 1.50 |
| Ethylene unit content (% by weight) | 61.0 | 54.8 | 34.9 | 60.1 |
| $[\eta]$ (dl/g) | 1.63 | 1.33 | 1.82 | 2.09 |
| CXS (% by weight) | 85.2 | 90.3 | 100 | 80.5 |
| $\Delta Hc$ (J/g) | 6.8 | 4.3 | 6.05 | 11.5 |
| Tg (° C.) | −54.5 | −54.1 | −44.7 | −53.1 |

Note:
2,6-DCP means 2,6-dichloropyridine.

Comparative Example 3

Example 5(2) was repeated except that (1) the component (C) was changed to 1.75 mL (0.10 mmol as 2,6-lutidine) of a heptane solution (concentration: 0.057 mmol/mL) of 2,6-lutidine, and (2) the amount of the solid catalyst component (component (A)) was changed to 13.0 mg, thereby obtaining 5 g of an ethylene-propylene copolymer. Polymerization activity per hour was 129 g-copolymer/g-catalyst/hr, and the product of a reactivity ratio of ethylene and propylene, $r_1 r_2$, was 2.65. The copolymer had an ethylene unit content of 38.2% by weight, the total amount of ethylene units and propylene units being 100% by weight; an intrinsic viscosity, $[\eta]$, of 1.52 dl/g; an amount of soluble parts in xylene at 20° C. (CXS) of 82.5% by weight, the total amount of the copolymer being 100% by weight; a crystallization heat ($\Delta Hc$) of 7.5 J/g; and a glass transition temperature (Tg) of −43.1° C. Results are summarized in Table 3.

TABLE 3

|  | Example 5 | Comparative Example 3 |
|---|---|---|
| Polymerization condition |  |  |
| Amount of component (A) (mg) | 11.4 | 13.0 |
| Component (C) |  |  |
| Kind | 2,6-dichloropyridine | 2,6-lutidine |
| Amount (mmol) | 0.10 | 0.10 |
| Propylene addition pressure (MPa) | 0.21 | 0.21 |
| Total pressure (MPa) | 0.71 | 0.71 |
| Polymerization time (minute) | 180 | 180 |
| Result |  |  |
| Polymerization activity (g-copolymer/g-catalyst/hr) | 645 | 129 |
| $r_1 r_2$ | 1.76 | 2.65 |
| Ethylene unit content (% by weight) | 47.0 | 38.2 |

TABLE 3-continued

|  | Example 5 | Comparative Example 3 |
| --- | --- | --- |
| [η] (dl/g) | 1.75 | 1.52 |
| CXS (% by weight) | 82.2 | 82.5 |
| ΔHc (J/g) | 2.6 | 7.5 |
| Tg (° C.) | −51.3 | −43.1 |

The invention claimed is:

1. A process for producing an olefin copolymerization catalyst, which comprises the step of contacting the following components (A), (B) and (C) with one another:
(A) a solid catalyst component containing a trivalent titanium atom, a magnesium atom and a halogen atom;
(B) an organoaluminum compound and/or organoaluminumoxy compound; and
(C) a nitrogen-containing aromatic heterocyclic compound, whose one or more carbon atoms adjacent to the nitrogen atom are linked to an electron-withdrawing group, or to a group containing an electron-withdrawing group.

2. The process for producing an olefin copolymerization catalyst according to claim 1, wherein the component (C) is a pyridine compound having an electron-withdrawing group or a group containing an electron-withdrawing group, at its 2-position, at its 2- and 6-positions, or at its 2-, 4- and 6-positions.

3. The process for producing an olefin copolymerization catalyst according to claim 1, wherein the component (C) is a pyridine compound having an electron-withdrawing group or a group containing an electron-withdrawing group, at its 2- and 6-positions.

4. The process for producing an olefin copolymerization catalyst according to claim 1, wherein the electron-withdrawing group is a halogen atom.

5. The process for producing an olefin copolymerization catalyst according to claim 1, wherein the component (A) is produced by a process comprising the step of contacting (a) a solid component containing a magnesium atom and a hydrocarbyloxy group, (b) a halogenation compound, and (c) an internal electron donor and/or (d) an organic acid halide, with one another.

6. The process for producing an olefin copolymerization catalyst according to claim 5, wherein the solid component (a) is a solid compound containing a trivalent titanium atom, and the solid compound is produced by a process comprising the step of reducing a titanium compound (ii) represented by the following formula [I] with an organomagnesium compound (iii) in the presence of an organosilicon compound (i) containing a Si—O bond, or in the presence of a combination of the organosilicon compound (i) with an ester compound (iv):

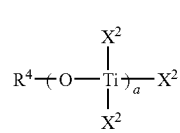

[I]

wherein a is a number from 1 to 20; $R^4$ is a hydrocarbyl group having 1 to 20 carbon atoms; and $X^2$ is, independently, a halogen atom or a hydrocarbyloxy group having 1 to 20 carbon atoms.

7. A process for producing an olefin copolymer, comprising a step of contacting two or more kinds of olefins with an olefin copolymerization catalyst produced by the process according to claim 1.

8. The process for producing an olefin copolymer according to claim 7, wherein the olefin is a combination of ethylene and an α-olefin.

9. The process for producing an olefin copolymer according to claim 7, wherein the olefin is a combination of ethylene and propylene.

10. The process for producing an olefin copolymer according to claim 7, wherein the contacting step is a step of copolymerizing ethylene with propylene in the presence of a propylene homopolymer, the propylene homopolymer having been produced in a step of propylene homopolymerization.

* * * * *